April 3, 1951   L. S. MEYER ET AL   2,547,880
METHOD AND APPARATUS FOR CORRUGATING SHEET MATERIAL
AND FORMING LAMINATED CELLULAR UNITS THEREOF
Filed Aug. 9, 1949   9 Sheets-Sheet 1

INVENTORS
Leonard S. Meyer.
Eric K. Ritterhoff.
BY
ATTORNEYS

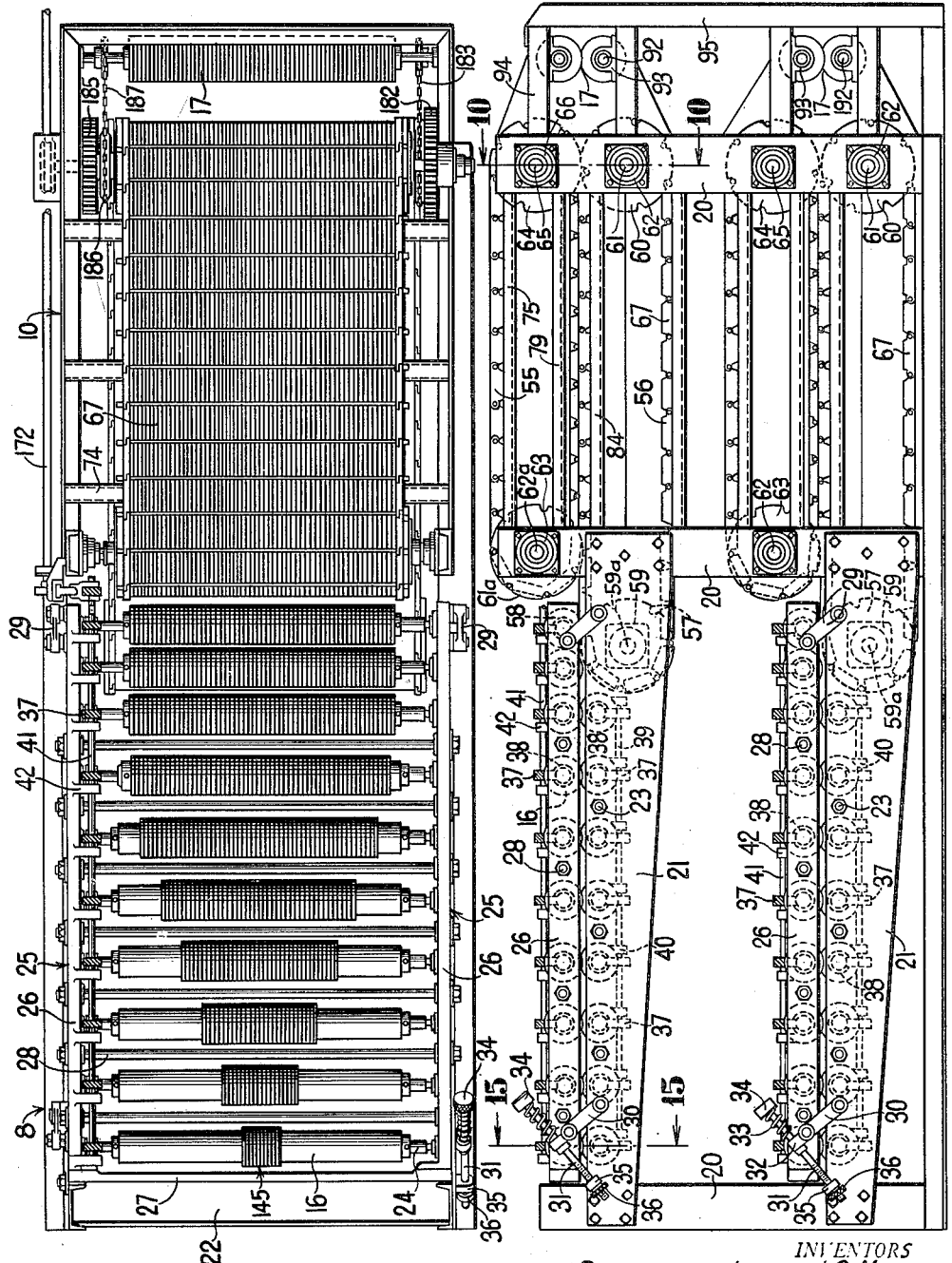

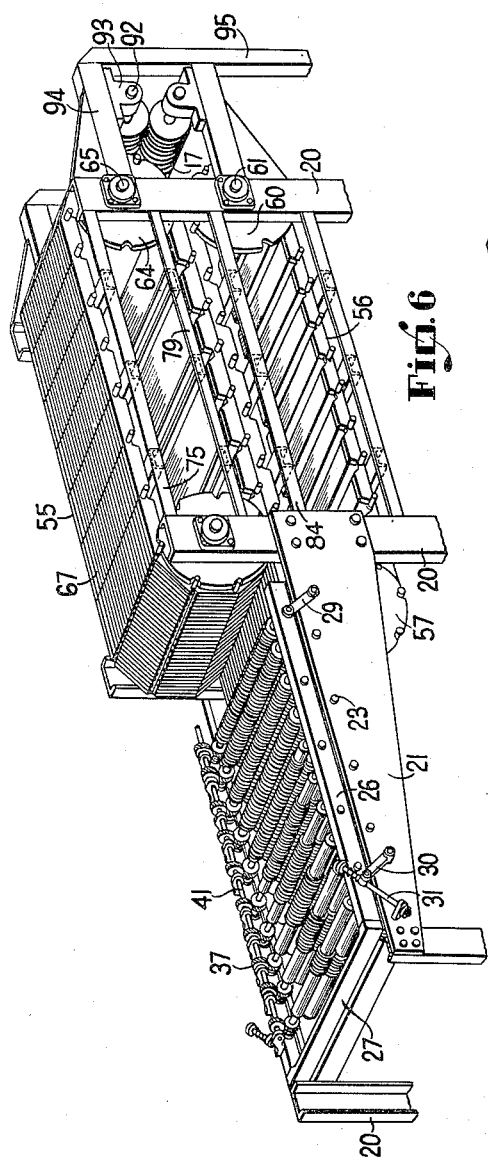
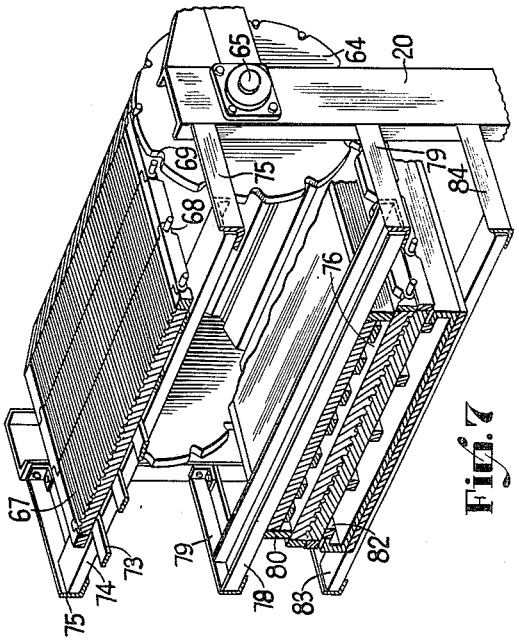
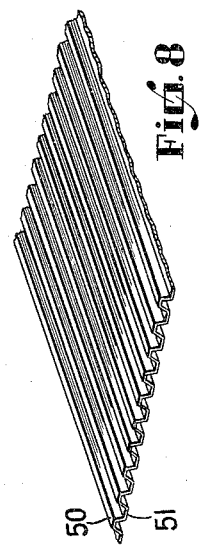
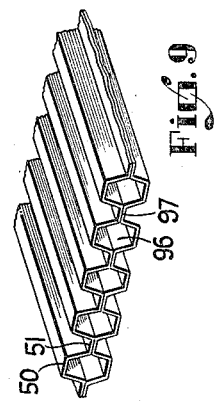

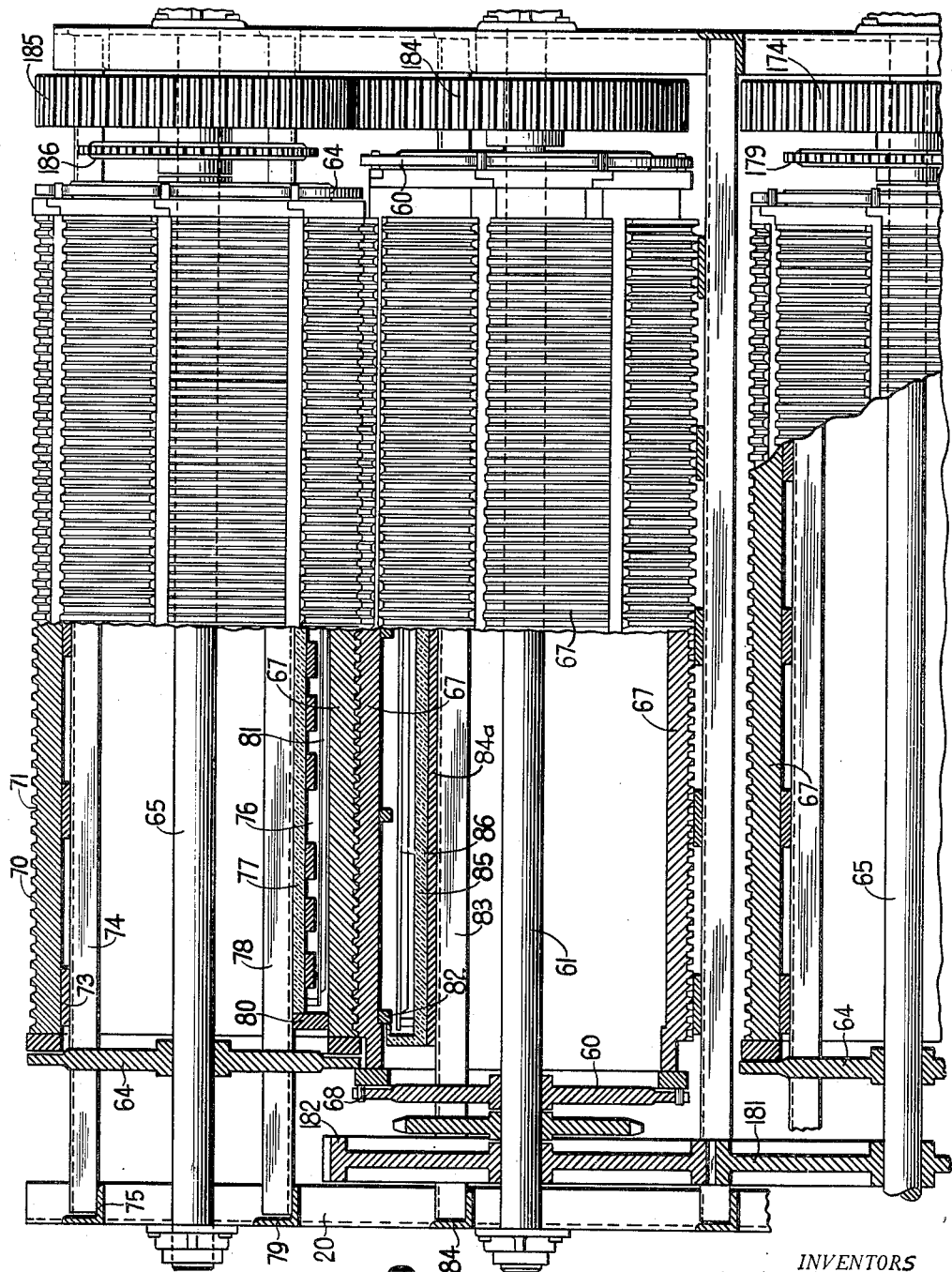

April 3, 1951  L. S. MEYER ET AL  2,547,880
METHOD AND APPARATUS FOR CORRUGATING SHEET MATERIAL
AND FORMING LAMINATED CELLULAR UNITS THEREOF
Filed Aug. 9, 1949  9 Sheets-Sheet 5
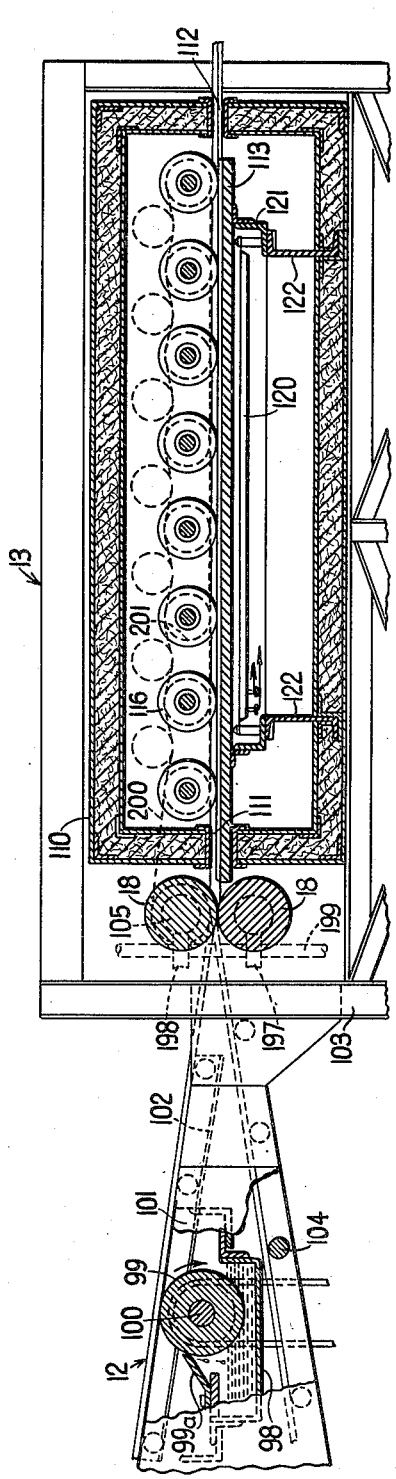
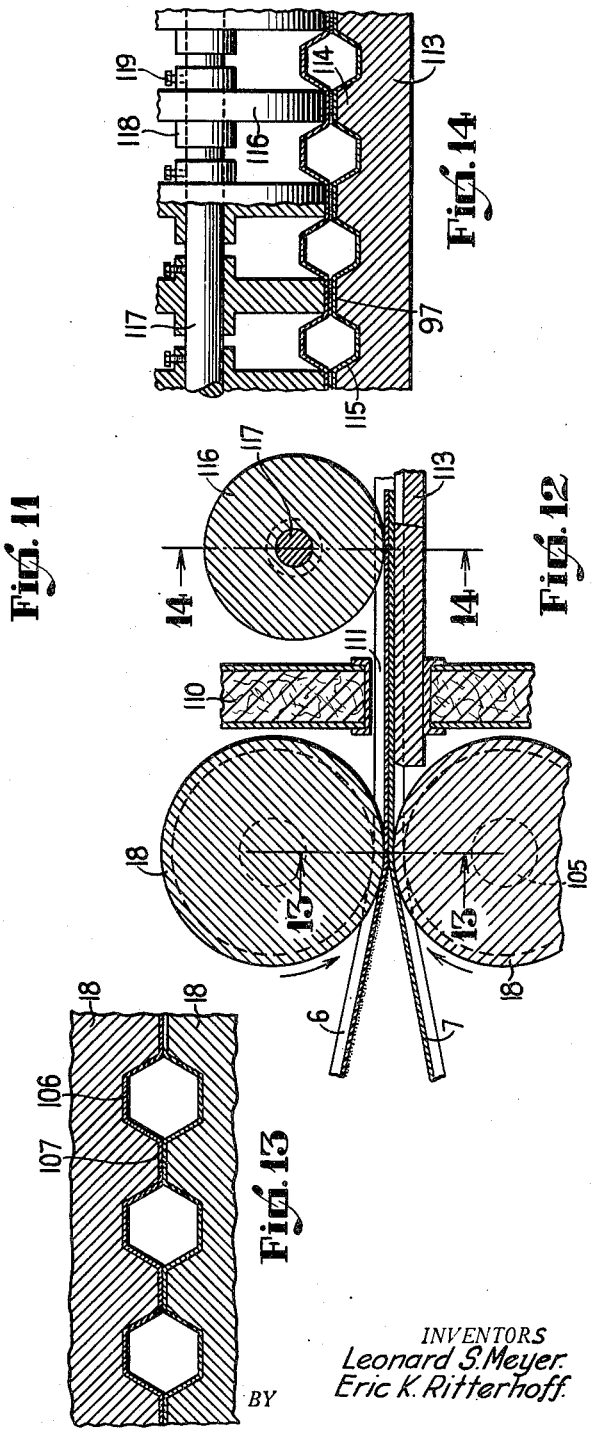
INVENTORS
Leonard S. Meyer.
Eric K. Ritterhoff.
BY
ATTORNEYS

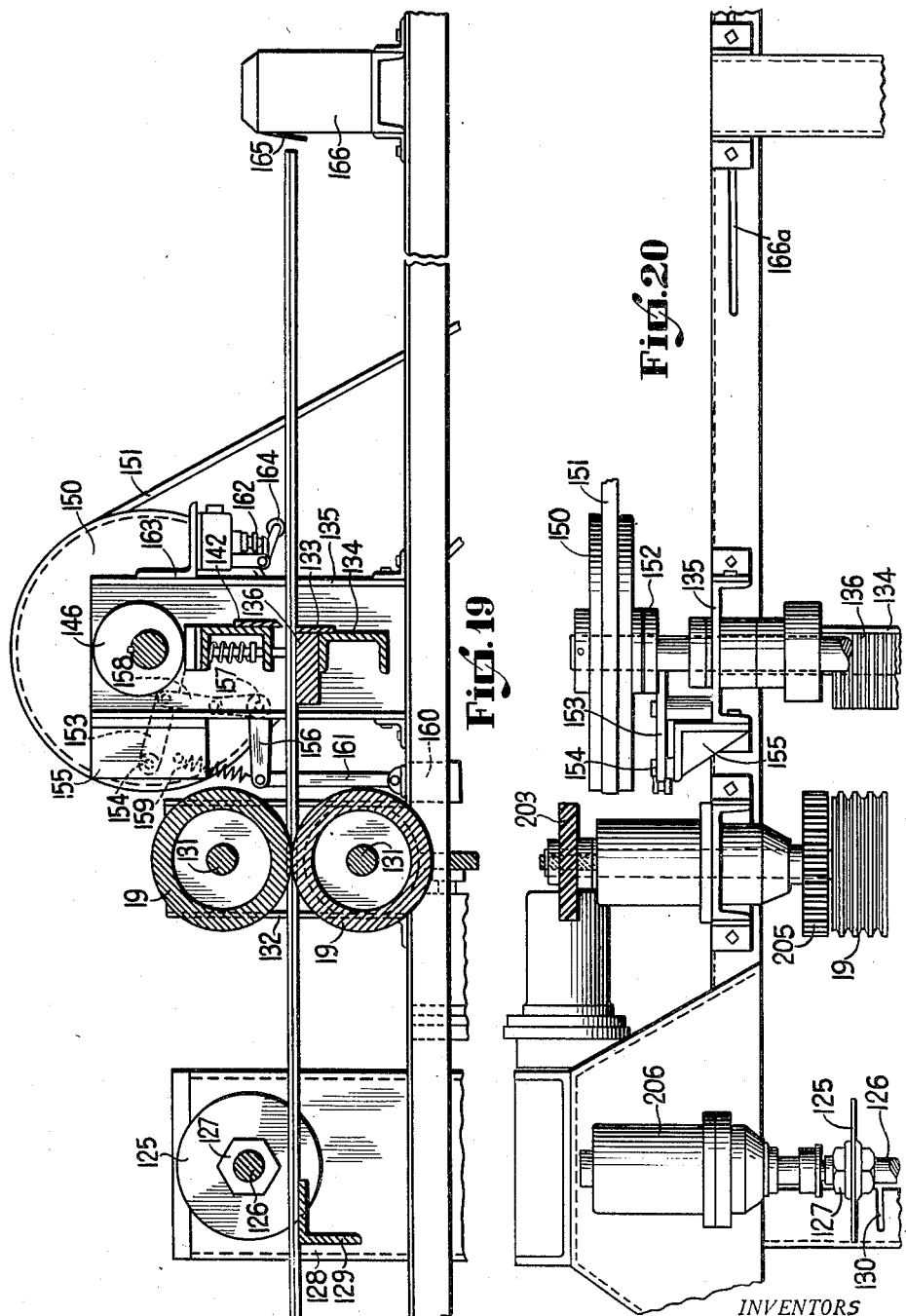

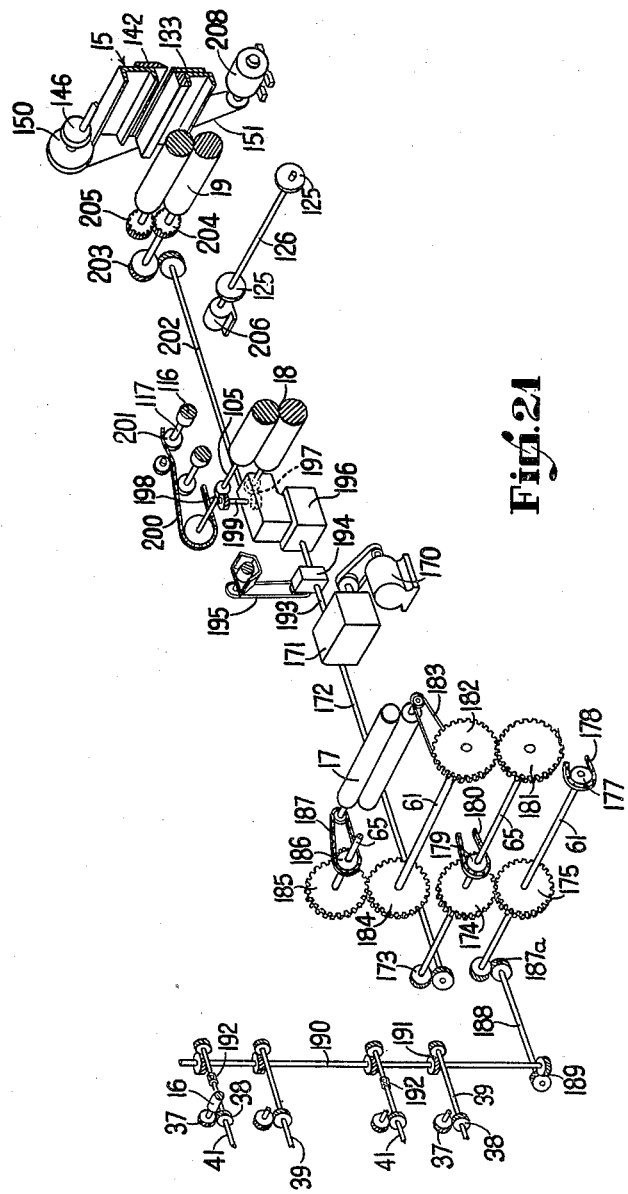

April 3, 1951  L. S. MEYER ET AL  2,547,880
METHOD AND APPARATUS FOR CORRUGATING SHEET MATERIAL
AND FORMING LAMINATED CELLULAR UNITS THEREOF
Filed Aug. 9, 1949  9 Sheets-Sheet 9

INVENTORS
Leonard S. Meyer.
Eric K. Ritterhoff.
BY
Corbett, Mahoney & Miller
ATTORNEYS Patented Apr. 3, 1951

2,547,880

UNITED STATES PATENT OFFICE 2,547,880

METHOD AND APPARATUS FOR CORRUGATING SHEET MATERIAL AND FORMING LAMINATED CELLULAR UNITS THEREOF

Leonard S. Meyer and Eric K. Ritterhoff, Newark, Ohio

Application August 9, 1949, Serial No. 109,366

24 Claims. (Cl. 154—31)

Our invention relates to method and apparatus for corrugating sheet material and forming laminated cellular units thereof. It relates, more particularly, to the forming and treating of sheet material consisting of resin-impregnated fiber glass cloth. More specifically, our method and apparatus is for the purpose of forming corrugations or longitudinally extending cells in the resin-impregnated fiber glass cloth and setting or curing the resin thereof so that the material will retain such shape and then superimposing and combining two or more layers of such sheet material in order to produce a honeycomb cellular unit which is suitable for structural purposes, for insulation, or for other uses. However, it is to be understood that this invention is not limited to the particular material specified above, that is, to resin-impregnated glass cloth.

It is the main purpose of our invention to provide a simple yet efficient method and apparatus for forming the longitudinally extending corrugations or cells in the resin-impregnated sheet material, for curing or setting the resin so that the material will retain such shape, for combining two or more layers of such material to produce a cellular or honeycomb laminated unit, for trimming the edges of the laminated unit, and for cutting sections of uniform length from such laminated unit, all of such operations being performed progressively and continuously.

According to our invention, a continuous strip from a roll of the resin-impregnated fiber glass cloth material is first drawn into a cell-forming unit between positively driven pairs of rollers which serve to form the longitudinally extending corrugations or cells in the strip of sheet material. These rollers are arranged in successive pairs, with the rollers of each pair being above and below the strip and having complementary interfitting ribs and grooves which produce the longitudinally extending corrugations or cells in the strip material. The pairs of rollers are so designed and arranged that the forming portions of successive pairs gradually increase in axial extent, the first pair acting at the center of the strip and the succeeding pairs acting on gradually increasing widths of the strip from the center thereof. With this arrangement, the corrugations are gradually formed in the strip from the center outwardly throughout the width of the strip and the edges of the strip are gradually drawn in as the strip decreases in width, due to the formation of the cells or corrugations therein. The rollers serve to grip and pull the strip material so as to keep it under tension while it is being formed so as to prevent wrinkling or buckling thereof.

The formed strip material then is drawn into a cell-curing or setting unit which consists of superimposed continuous belts formed of a number of flexibly joined platens. The platens of the upper belt are provided with alternate longitudinally extending ribs and grooves which interfit with similarly formed but complementary ribs and grooves in the platens forming the lower belt. The interfitting ribs and grooves of the two superimposed platen belts are of identical cross-sectional shape to the ribs and grooves of the rollers of the forming unit. The previously formed corrugated strip material will pass continuously between these platen belts, which are preferably heated to a sufficient temperature to set or cure the resin of the strip material passing therebetween, the platen belts also serving to create pressure on such material. The heat and pressure will cure or set the material in the condition or shape which has been previously imparted thereto.

The cell-forming and cell-curing units, that is, the roller unit and the platen belts unit, are duplicated with the duplicate units being disposed in superimposed relationship so that two strips of the material are simultaneously formed. These upper and lower strips are pulled through the respective cell-curing units by means of positively driven gripping rollers disposed beyond the platen belts which will exert sufficient pull to keep the sheets under tension while the platens are acting thereon so as to prevent buckling or wrinkling of the material during the curing and setting operation. The two formed strips are identical except that the grooves and ribs are formed in opposite faces.

The two strips of material as they are drawn from the curing units are gradually brought together into a cell-combining unit. However, before they enter into this unit at least one of the adjacent surfaces of the strips is coated by a roller with a suitable cement or adhesive, preferably in the form of a plastic. Beyond this coating roller before the cell-combining unit is reached, the strip is drawn between positively driven gripping rollers which serve to keep the strip under tension during coating with the adhesive. In the cell-combining unit, the two continuously moving strips are rolled and pressed together so as to cause them to adhere to each other. The ribs on the lower face of the upper strip will contact and adhere to the ribs on the upper face of the lower strip. This cell-combining unit includes heating means which will heat the laminated unit during its continuous movement sufficiently to set or cure the resin cement and cause the strips to be permanently bonded together. It will be apparent that since the two layers of material are corrugated and are aligned with each other in face-to-face relationship as indicated above, the resulting laminated structure will consist of longitudinally extending continuous cells which are laterally spaced by grooves on both surfaces of the unit and which are open only at the ends of the strip.

The laminated cellular unit is then drawn through an edge trimming unit which trims off the rough edges of the strip. Beyond this trimmer are additional positively driven gripping rollers which serve to draw the material through the cell-combining unit and edge trimming unit to prevent wrinkling or buckling thereof. The trimmed laminated strip then passes to a shearing unit which automatically shears the strip into sections of uniform length. These sections may be superimposed and combined together to form a block consisting of any desired number of laminations.

All of the above-indicated operations are performed automatically sequentially during the continuous movement of the material. The succeeding gripping rollers are driven at progressively increased speeds to keep the material under tension during all operations.

In the accompanying drawings, we have illustrated our method and one form of apparatus which we preferably employ for performing our method.

In these drawings:

Figure 4 is a plan view illustrating the associated cell-forming and cell-curing units of our apparatus.

Figure 5 is a side elevational view of the apparatus shown in Figure 4.

Figure 6 is a perspective view of one of the cell-forming units and associated cell-curing unit of our apparatus.

Figure 7 is a perspective view of a portion of the cell-curing unit of Figure 6.

Figure 8 is a perspective view illustrating a portion of one of the formed strips of the corrugated material.

Figure 9 is a similar view illustrating two of the strips of Figure 8 joined to form a laminated cellular unit.

Figure 10 is a transverse vertical sectional view taken on line 10—10 of Figure 5 through the cell-curing unit.

Figure 11 is a view, partly in side elevation and partly in vertical longitudinal section, illustrating the adhesive-applying and cell-combining units of our apparatus.

Figure 12 is a detail in vertical longitudinal section illustrating the bringing of the strips of material together and the rolling and pressing of the strips together by the cell-combining unit.

Figure 13 is a transverse vertical sectional view taken along line 13—13 of Figure 12.

Figure 14 is a transverse vertical sectional view taken along line 14—14 of Figure 12.

Figure 19 is a vertical longitudinal sectional view through the trimming and shearing units of the apparatus.

Figure 20 is a plan view of one side of the apparatus of Figure 19.

Figure 21 is a schematic view illustrating the driving mechanism of the apparatus.

Figure 1:
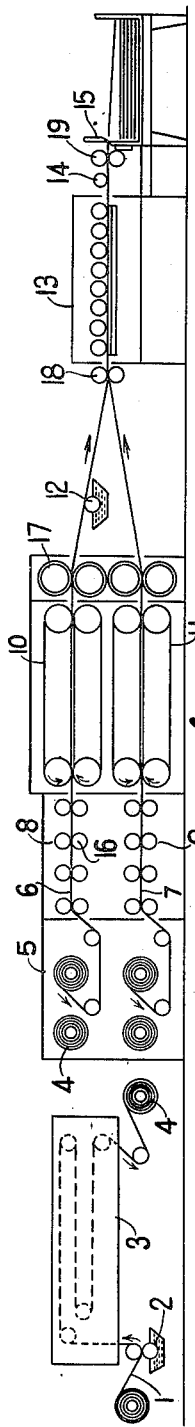
Figure 1 is a diagrammatic view illustrating the successive steps of our method.

With reference to the drawings, in Figure 1, we have illustrated diagrammatically the steps of our method. The material to be corrugated is prepared in a suitable manner. For example, if the material is resin-impregnated fiber glass cloth, it may be prepared as indicated in Figure 1. The strip 1 of the glass cloth is passed through a coating and/or impregnating unit 2 which will apply to the cloth the resin material. The strip is then passed through a heating unit 3 which will heat the cloth sufficiently to evaporate solvent or to set the resin sufficiently so that it will not be sticky. The strip is then rolled on a roll 4. The resin which coats and impregnates the cloth may be of any suitable type either thermoplastic or thermosetting. It is preferred to use glass fiber cloth although other types of material may be employed.

Several of the rolls 4 are then placed in a material-supplying unit 5. From this unit an upper strip 6 and a lower strip 7 are drawn simultaneously. The two strips are then subjected to the forming and combining operations according to our invention. However, it is to be understood that instead of treating two strips simultaneously any desired number may be treated and later combined in the same manner as illustrated for the two strips.

The two strips are first drawn into the superimposed cell-forming units 8 and 9 where the corrugations are formed therein. Then they are drawn into the cell-curing or setting units 10 and 11 which are superimposed and which serve to cure or set the resin of the material. The next step is to coat one of the adjacent surfaces of the two strips with a suitable adhesive and this is accomplished by the unit 12. The two strips 6 and 7 are then brought together in the cell-combining unit 13 where they are subjected to heat and pressure to secure them together. Next, the laminated strip is subjected to the trimming unit 14 which trims its edges and finally is subjected to the shear unit 15 which shears the laminated strip into sections of uniform length. During all of these operations, the strips are pulled through the apparatus continuously. The pulling through of the strips is accomplished by the pairs of rollers 16 of the units 8 and 9, the pairs 17 of pull through rollers beyond the cell-curing units 10 and 11, the pull through and pressing rollers 18 just ahead of the cell-combining unit 13, and the pair 19 of pull through rollers disposed between the trimmer 14 and the shear unit 15. As will be explained later, these pull through rollers are driven at different speeds, the speed of each successive pair along the apparatus being increased to always keep the strips of material under tension to prevent wrinkling or buckling of the material during the various operations thereon.

Figure 2:
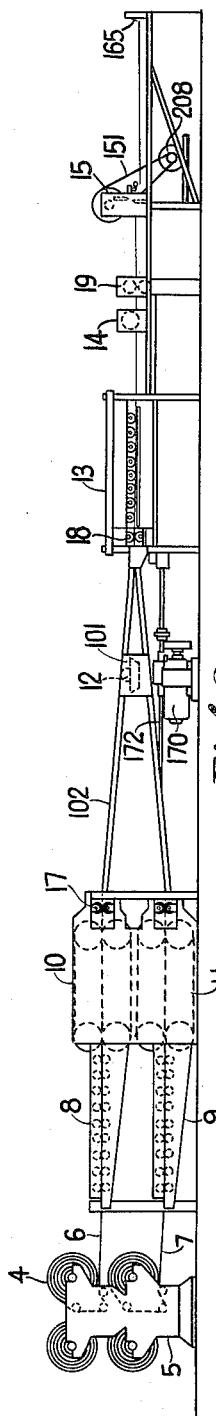
Figure 2 is a diagrammatic view in side elevation of the apparatus which we preferably employ in performing our method.
Figure 3:
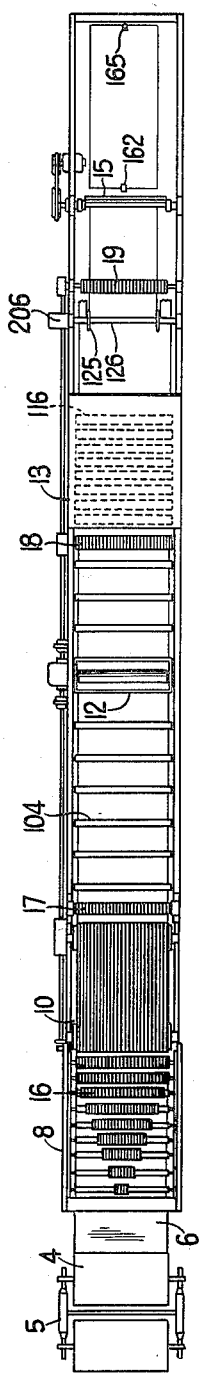
Figure 3 is a plan view of the apparatus shown in Figure 2.

The material-supplying unit 5 may be of any suitable type but as shown in Figures 2 and 3 is of such a nature that it can support two upper rolls and two lower rolls of the material 4. Duplicate material rolls allow continuous operation by splicing during web travel. The strip 6 is unwound from either of the upper rolls while the strip 7 is unwound from either of the lower rolls. As indicated above, the strip 6 is first drawn into the cell-forming unit 8 and the strip 7 into the cell-forming unit 9. These units 8 and 9 are of identical construction and are shown best in Figures 4, 5, 6 and 14. The two units are supported in superimposed relationship on framework which includes the vertically disposed columns 20. Since the units are identical, a description of one will suffice.

As previously indicated, the cell-forming unit includes the pairs of rollers 16 which are arranged in longitudinally spaced relationship. The rollers extend transversely and the lower roller of each pair is carried by the longitudinally extending side beams 21 which are bolted to the columns 20. The columns 20 at opposite sides are rigidly joined together by beams 22 extending transversely and the beams 21 are provided with transversely extending tie rods 23 at longitudinally spaced intervals. Each of the rollers 16 includes a shaft 24, the lower rollers having their ends rotatably mounted in suitable bearings provided on the beams 21, between which they are disposed. The upper roller 16 of each pair is carried by a vertically movable frame 25. This frame consists of the longitudinally extending members 26 which are joined together by transversely extending end members 27 and transversely extending tie rods 28 which are disposed at longitudinally spaced intervals. The shafts 24 of the upper rollers are journalled in bearings carried by the side members 26.

As shown best in Figure 6, the frame 25 may yield upwardly when sufficient pressure is applied thereto. The frame 25 is connected to the beam members 21 by means of a forward pair of links 29 and a rearward pair of links 30. The upper ends of the links are pivoted to the frame and their lower ends are pivoted to the beams 21, the links being normally disposed in rearwardly and upwardly inclined relationship. Associated with each of the rearward links 30 is a spring plunger unit which comprises a pin 31 which passes loosely through the end 32 of the link 30 and which has a compression spring 33 disposed between the link and a head 34 on the end of the pin. The opposite end of the pin passes loosely through a lug 35 and is provided with a head 36 which serves as a stop. It will be noted that the pin 31 extends downwardly and rearwardly. Normally, the frame 25 is held downwardly so that the pairs of rollers 16 contact with each other but when material is fed between the rollers, the upper frame 25 can yield slightly, this pressure tending to swing the links 30 forwardly against the resistance of the springs 33. The ends of the rear columns 20 extend upwardly so as to protect the frame 25 and it will be noted that there are no obstructions at the forward end of the frame which would interfere with upward yielding thereof.

Each of the rollers 16 is positively driven. For this purpose, each of the roller shafts 24 has a pinion 37 keyed on its outer end, as shown best in Figure 15. This pinion 37 meshes with an associated driving pinion 38. The pinions 38 for driving the lower rollers are carried at longitudinally spaced intervals on a longitudinally extending shaft 39 to which they are keyed. This shaft 39 is carried by bearing brackets 40 secured to the adjacent beam 21. Similarly, the pinions 38 for driving the upper rollers are carried on a longitudinally extending shaft 41 which is carried by brackets 42 secured to the channels 26 of the upper frame 25. As will be explained later, the shafts 39 and 41 are positively driven so that all the rollers 16 are driven.

Figure 15:
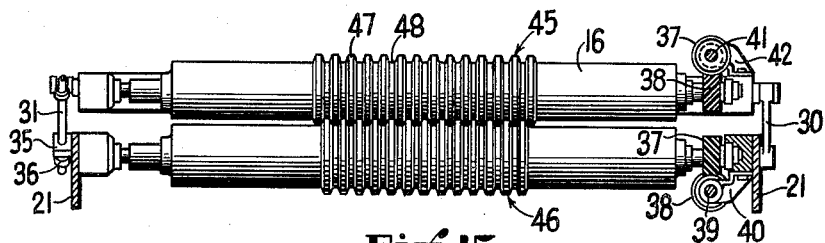
Figure 15 is a transverse vertical sectional view taken along line 15—15 of Figure 5 illustrating a pair of the forming rolls of the cell-forming unit.
Figure 16:
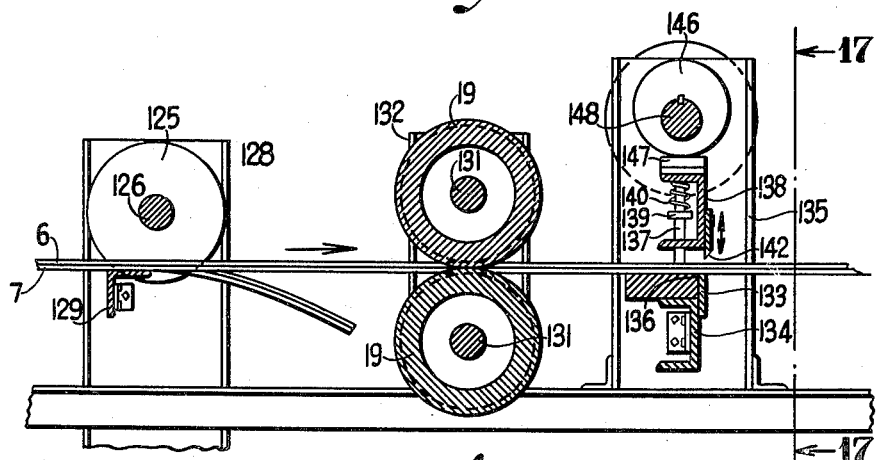
Figure 16 is a view mainly in vertical longitudinal section illustrating the edge-trimming unit and shearing unit of our apparatus.

As shown in Figure 15, each of the rollers 16 is provided with a corrugating forming section at the center thereof. The section 45 of the upper roller and the section 46 of the lower roller are complemental to each other and include the alternate ribs 47 and grooves 48. The ribs of the upper roller fit into the grooves of the lower roller and vice versa. Consequently, when material is passed therebetween, they produce alternate grooves and ribs or corrugations extending longitudinally of the material. When the end of the strip of material to be formed is inserted between the roller 16 of the first pair, it will be gripped by the positively driven rollers and all of the succeeding pairs of rollers and will be pulled through the cell-forming unit. It will be clear from Figures 3, 4 and 6 that the forming portion or section of each succeeding pair of rollers 16 increases in width or axial extent. The forming portions of the first pair are very narrow and extend from the center line of the unit laterally in both directions to a slight extent. The width of these portions is increased until the last several pairs of rollers have forming portions extending the full length thereof. The purpose of this arrangement is to provide for forming the corrugations from the center of the sheet outwardly gradually until the full width of the sheet is corrugated. This not only will form the corrugations in the sheet but will gradually narrow the sheet as it passes through the forming unit. During this forming operation the sheet will be under tension since the roller 16 will grip it and pull it therethrough. Because of the vertically yieldable frame 25, the unit will adjust itself to act on strips of any selected thickness.

After passing through the cell-forming units 8 and 9, the strips 6 and 7 will have the appearance shown in Figure 8. The strip will be provided with alternating longitudinally extending ribs 50 and grooves 51. These alternating ribs and grooves may be of any cross-sectional shape which will be determined by the shape of the ribs 47 and grooves 48 on the forming rollers. If the material is resin-impregnated material, it will have some resiliency and tend to return to its original flat shape. To overcome this, it is necessary to subject the strip to a setting operation which will set or cure the resin and cause the material to retain the shape imparted thereto. This is accomplished with the superimposed cell-curing units 10 and 11 through which the strips 6 and 7 are next drawn as indicated in Figures 2 and 3. The units 10 and 11 are of the same construction and, therefore, only one will be described in detail.

The cell-forming unit is illustrated best in Figures 4 to 7 and 10. These units are disposed directly beyond the units 8 and 9 and in association therewith. Each unit comprises a continuous upper platen belt 55 and a continuous lower platen belt 56. The lower belt 56 is carried by a pair of sprockets 57 which are disposed beneath the forward end of frame 25, as shown best in Figure 5, it being noted that the frame 25 carries two longitudinally spaced upper rollers 58 disposed above the rear end of the lower belt 56. These rollers will cooperate with the platen belt to aid in pulling the strip through the forming unit into the curing unit. The rear sprockets 57 are keyed on a transverse shaft 59a which is carried by bearings 59 secured to the inner surfaces of the beams 21. The forward end of the lower belt 56 is carried by sprockets 60 which are keyed on a transverse shaft 61 that is rotatably carried by bearings 62 provided in upstanding columns 20. The upper platen belt 55 is carried by a pair of rearward sprockets 61a which are keyed on a transverse shaft 62a that is rotatably carried by bearings 63 on upwardly extending portions of columns 20, and by a pair of forward sprockets 64 which are keyed on a transverse shaft 55 that is carried by bearings 66 mounted on the upwardly extending portions of columns 20.

Each of the platen belts comprises a series of transversely extending platens 67 which are hinged together by hinge pins 68 to form the flexible belts. These hinge pins 68 extend from each side of the belt and cooperate with the notches 69 in the peripheries of the various sprockets in supporting and driving the belts. Each platen 67 is provided with laterally alternating longitudinally extending ribs 70 and grooves 71 as shown best in Figure 10. The ribs and grooves of the platens of the upper belt 55 are arranged so that they will be complemental with the ribs and grooves on the platens of the lower belt 56. Furthermore, the ribs and grooves of the upper belt 55 are in alignment with the ribs and grooves of the upper rollers 16 while the ribs and grooves of the lower belt 56 are in alignment with the ribs and grooves of the lower rollers 16. Also, the ribs and grooves of rollers 58 are in alignment with the corresponding parts of upper roller 16 and the upper platen belt 55.

The upper and lower platen belts 55 and 56 are driven at the same linear speed. Furthermore, the upper and lower belts of the upper unit 10 are synchronized with the movement of the belts of the lower unit 11. The means for driving these various belts in timed relationship will be described in detail later.

The upper flight of the upper belt 55 is supported by longitudinally extending laterally spaced rails 73 which are carried by transversely extending inverted channel members 74 that are carried by longitudinally extending angle members 75 secured to the upstanding portions of the columns 20. In order to heat the lower flight of the upper belt 55, a heating chamber 76 is provided directly above such flight as shown in Figure 10. This chamber is formed by an insulating plate 77 which constitutes the top wall of the chamber and which is carried by transversely extending channel members 78 that have their ends supported on longitudinally extending angle members 79 carried by the columns 20. The bottom of the chamber 76 is formed by the upper surfaces of the platens 67 and its side edges are closed by rails 80 which also serve to hold the lower flight of the belt downwardly so that it will be in position to cooperate with the upper flight of the lower belt 56. The heating chamber 76 is preferably provided with transversely extending electric heaters 81 which are disposed at longitudinally spaced intervals.

The upper flight of the lower belt 56 is supported in association with the lower flight of the upper belt by means of a plurality of longitudinally extending laterally spaced rails 82 along which the platens slide. These supporting rails 82 are supported by transversely extending channel members 83 which are carried by longitudinally extending angle members 84 carried by the columns 20. The channels 83 also carry a supporting plate 84a on the upper surface of which is carried a trough-shaped chamber 85, this chamber being provided with the transversely disposed electric heaters 86 similar to the heaters 81. The upper side of the chamber 85 is formed by the platens 67 of the lower belt 56. The bars 82 serve to support the upper flight of the belt in horizontal position so that the lower flight of the upper belt can be guided into association therewith by the rails 80. It will be noted best from Figure 5 that the upper chain 55 is so arranged relative to the lower chain 56 that as the lower and upper flights of the respective belts come together, the hinge joints of the one belt are staggered relative to the hinge joints of the other. This will prevent a ridge being formed across the material which would happen if the hinge joints were in alignment. It will be apparent that as the formed material enters the curing unit it is first engaged by rollers 58 which cooperate with the upper flight of the lower belt 56, being driven at the same linear speed and complementally interfitting with the platens thereof. As the material is drawn through the curing unit between the adjacent flights of the two belts 55 and 56, the ribs and grooves 70 and 71 of the platens will register with the channels and grooves 51 and 50 previously formed in the strip of material. The heat and pressure developed in this unit will serve to set or cure the plastic material. The temperature employed in this operation will depend upon the type of resin used for impregnating the material.

The strips 6 and 7 are pulled through the units 10 and 11 by upper and lower pairs of rollers 17 respectively. These pull through rollers 17 will have surfaces of the same complemental configurations as the forming rollers 16 and will extend transversely at least the complete width of the strip of material. The rollers 17 are driven positively in a manner to be described later and will serve to grip the strips of material and serve to keep them under tension as they are pulled through the units 10 and 11. The rollers 17 are driven at a slightly greater speed than the forming rollers 16 and have a peripheral speed slightly greater than the linear speed of the belts of the units 10 and 11. This will serve to prevent wrinkling or buckling of the strips of material as they are pulled through the units 10 and 11.

It will be noted that a pair of rollers 17 is supported adjacent the upper unit 10 and a pair adjacent the lower unit 11 so that they will receive the respective strips 6 and 7 from these units. Each of the rollers includes a shaft 92 which is rotatably mounted in bearing members 93. These bearing members 93 are carried on longitudinally extending supports 94 which have their forward ends secured to columns 20 and their rear ends supported by post 95.

With the two strips 6 and 7 now formed and set, the next operation is to bring them together to form the laminated unit shown in Figure 9. To form this unit, the strips will be brought into face-to-face contact with the ribs 50 of the lower strip contacting with the grooved portions 51 of the upper strip. This will produce the longitudinally extending cores or cells 96 which are spaced from each other but joined together by the flanges 97. The upper forming and curing units are properly aligned with the lower forming and curing units to bring these two strips into proper contacting relationship.

After leaving the pull through rollers 17, the lower surface of the upper strip 6 is preferably drawn over the adhesive-applying unit 12 as previously indicated. However, the adhesive may be applied to the upper surface of the lower strip 7 if desired. The unit 12 is illustrated best in Figure 11. It comprises a transversely extending trough 98 which is adapted to contain the resin or other adhesive. A transversely extending adhesive-applying smooth surface roller 99 is provided in association with the trough and extends down into the liquid provided therein. An adjustable ductor blade 99a is associated with roller 99. The roller 99 is carried on a transversely disposed shaft 100 which is carried in bearings provided in the side plates 101 which are shown best in Figures 2 and 11. These plates 101 are carried by a pair of angle members 102 provided at each side of the apparatus and extending between the post 95 which aid in supporting the rollers 17 and the frame structure 103 of the cell-combining unit 13. The angle members 102 converge in a vertical direction towards the unit 13. Each angle member in co-operation with the corresponding angle member at the opposite side of the apparatus supports a plurality of transversely extending longitudinally spaced idler rollers 104. The upper idler rollers 104 may be of the same configuration as rollers 17 or may have a smooth surface and will be in alignment with the adhesive-applying roller 99. The lower rollers 104 may be of similar configuration and will engage the lower surface of the lower strip 7 without damaging the corrugations thereof.

It will be apparent from Figures 2 and 11 that when the strips 6 and 7 leave the rollers 17, they will be guided by the rollers 104 gradually towards each other and will converge at the rollers 18. The rollers 18 are mounted on the frame 103 of the unit 13. Each roller includes a shaft 105 which is mounted in suitable bearings carried by the frame. The rollers 105 are both positively driven and are in contact with each other. Since these rollers are adapted to grip the laminated unit of Figure 9, they are of different configuration from all the rollers previously mentioned. The upper and lower rollers are identical and each comprises grooves 106 (Figure 13) for receiving the ribs of the laminated strip and ribs 107 for fitting into the grooves thereof and engaging the flanges 97. The ribs of the two rollers are in alignment with each other so that the flanges 97 will be gripped between the upper and lower rolls. These rolls 18 serve to pull the strips 6 and 7 towards the unit 13, the strip 6 being pulled over the adhesive-applying unit 12, where adhesive will be applied to the ribs of the strip which contact the roller. The rolls 18 are driven at a speed slightly greater than the rollers 17.

The unit 13 is adapted to press the two strips 6 and 7 together and to heat the resin adhesive which is used to join the sheets together until it sets. This unit is illustrated best in Figures 11, 12 and 14. It comprises a heating chamber or oven 110 which is provided with an inlet slot 111 at one end and an outlet slot 112 at the other end which are horizontally disposed and through which the laminated strip passes. A strip-supporting plate 113 is provided just beyond the rollers 18 and substantially throughout the length of the oven. This plate will have the cross-sectional shape illustrated in Figure 14 having longitudinally extending ribs 114 and grooves 115 which alternate laterally so that the plate will have a surface complemental to the lower surface of the laminated strip, as shown in Figure 14. For pressing the laminated strip against the plate 113, a series of sets of driven rollers 116 are provided at longitudinally spaced intervals within the oven. Each set of rollers 116 includes a plurality of rollers axially spaced on a transverse shaft 117 which is carried in bearings mounted on the side walls of the oven 110. Each roller includes a sleeve 118 which is fixed to the shaft by a set screw 119. Thus, the rollers may be accurately adjusted axially of the shaft so that each roller will engage the flanges 97 of the laminated unit and press them against the ribs 114 of the plate 113. The shafts 117 are positively driven by means to be described later.

In order to set or cure the resin adhesive, the plate 113 is heated. This is accomplished with electric heaters 120 which are disposed directly below the plate in the oven 110. It will be noted that the heaters are supported by transverse angle members 121 which also carry the plate 113. These angle members are supported by transverse channel members 122 which are carried by the bottom of the oven.

It will be apparent that as the laminated strip is drawn through the unit 13, the rollers 16 and ribs 114 will press the flanges 97 together and the heat developed in the oven will cure the resin adhesive and bind the two strips together.

As the laminated strip leaves the unit 13, it is moved into association with the trimming unit 13 which is illustrated best in Figures 2, 3, 16, 19 and 20. This trimmer comprises a pair of cutting discs 125 which are mounted on a transversely extending shaft 126 each being adjustably coupled thereto by a clamping unit 127 so that they may be adjusted axially of the shaft depending upon the width to which the strip is to be trimmed. The shaft 126 is carried by bearings provided in upstanding brackets 128 which are secured to the sides of a horizontal frame portion 129 for supporting the strip during the trimming operation, a transversely extending angle member 129 is provided. The horizontal flange of this member is provided with slots 130 for receiving the cutting disc 125. The shaft 126 is positively driven so as to positively drive the cutting disc. The disc will serve to trim off the edges of the strip as it is pulled over the support 129 as illustrated best in Figure 16.

After the laminated strip leaves the edge trimmer 14, it passes between the final pull through rollers 19. These rollers will be the same shape as the rollers 18 so as to grip the laminated strip. Each roller is carried by a transversely extending shaft 131, the shafts being carried in bearings provided in upstanding portions of columns 132 provided at each side of the frame portion 129. The rollers 19 are driven at a slightly greater speed than the rollers 18 so as to keep the laminated strip under tension as it passes through the units 13 and 14.

Figure 17:
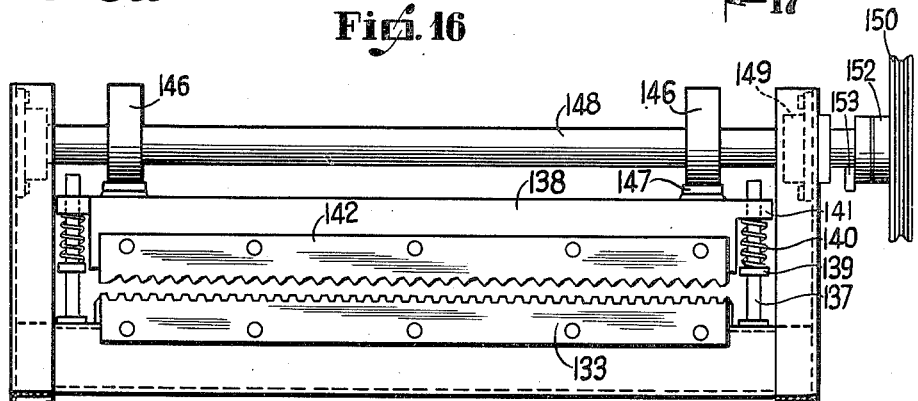
Figure 17 is a transverse vertical sectional view taken along line 17—17 of Figure 16.
Figure 18:
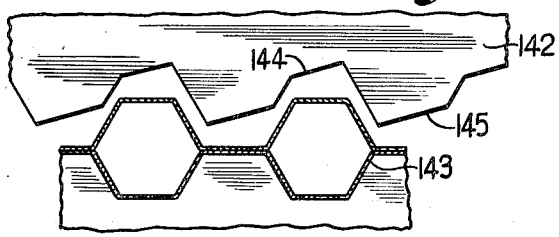
Figure 18 is a detail illustrating the shape of the cutting edges of the shearing blades.

Beyond the rollers 19, the laminated strip is passed through the shearing unit 15 which is shown best in Figures 16 to 20. This unit comprises a lower transversely extending stationary shear blade 133 which is carried by a transverse channel 134 which is rigidly secured to upstanding brackets 135 provided at each side of the frame 129. The blade is mounted directly on the forward edge of a shelf 136 carried by the channel 134. As shown in Figure 17, the shelf 136 is provided at each end with upstanding pins or posts 137 on which the ends of a transversely extending shear-supporting member 138 are slidably mounted. Each post is provided with a fixed collar 139 which supports a compression spring 140 that engages the lug 141 on member 138. Thus, the springs 140 normally keep member 138 in its uppermost position. This member 138 carries at its forward side a shear blade 142. It will be noted from Figure 18 that the lower stationary blade 133 is provided with a serrated shearing edge 143 which is complemental to the lower surface of the laminated strip. The movable blade 142 is provided with a serrated shearing edge 144 which is complemental to the upper surface of the laminated strip having cutting portions 145 for engaging the flanges 97 of the strip which are angularly disposed relative thereto so that the shearing action will be gradual. The blade-supporting member 148 is moved vertically by means of a pair of cams 146 which engage flat wearing portions 147 on the upper surface of member 138. These cams 146 are keyed to a transversely extending heavy shaft 148 which is rotatably mounted in bearings 149 mounted on the upper portions of the brackets 135. It will be apparent that rotation of shaft 148 will rotate the cams 146 and move the member 138 vertically on the post 139. The cams will move the member 138 downwardly against the resistance of the springs 140 which tend to raise the shearing blade 142.

The shaft 148 is rotated intermittently to intermittently rotate the cams 146 so as to move the shearing blade 142 downwardly at intervals. These intervals are timed relative to the movement of the laminated strip so that equal sections of the strip are successively sheared off. As shown in Figures 19 and 20, the shaft 148 has a flywheel 150 loosely mounted on one end thereof. This flywheel is driven continuously by a belt 151. Next to the flywheel on the shaft 148 is a clutch 152. This clutch 152 may be actuated by means of an arm 153 pivoted at 154 to a bracket 155 which is secured to the upper end of column 135. The arm 153 is swung about its pivot by means of a bell-crank lever 156 which is pivoted at 157 to the column 135 and is connected to the arm 153 by a link 158. A spring 159 acts on the bell-crank lever to normally keep the clutch disengaged. The bell-crank lever is adapted to be swung around its pivot by means of a solenoid 160 which is connected thereto by a pivoted link 161. The solenoid 160 is controlled by a micro-switch 162 carried by the columns 135 through the medium of a transverse support 163. The switch 162 preferably is at the center of the support 163 and is provided with a roller 164 that engages the upper surface of the laminated strip. A second micro-switch 165 is also provided for controlling the solenoid. This switch is carried by a pedestal 166 which is disposed at the end of the frame 129. The pedestal 166 is adjustably supported for longitudinal adjustment on frame 129 by means of a slot and bolt connection 166a. The switches 164 and 165 are preferably so connected in the circuit with the solenoid that when the end of the laminated strip contacts switch 165 the solenoid is energized and thereby engages the clutch 152. This will rotate the cams 146 and actuate the shears. As soon as the section is sheared from the laminated strip, it will drop downwardly and the switch 162 will act to de-energize the solenoid and disengage the clutch thereby preventing further rotation of the cams. The switch 165 is such that it will return to its original condition as soon as the section of the strip drops. By adjusting pedestal 166 longitudinally to change the longitudinal position of switch 165, the length of the sections sheared from the laminated strip can be varied.

The driving mechanism for the apparatus is illustrated best in Figure 21. This mechanism will drive and synchronize all the units. It comprises an electric motor 170 which drives the gear box 171. This box 171 drives a rearwardly extending shaft 172. The shaft 172 by means of pinions 173 drives the transverse shaft 65 of the upper belt 55 of lower cell-curing unit 11. The shaft 65 has a gear 174 keyed on one end thereof which meshes with a gear 175 keyed on the same end of shaft 61 of the lower belt 56 of lower unit 11. The shaft 61 also carries a sprocket 177 on its opposite end which drives a sprocket drive 178 to the lowermost of the lower pair 17 of rollers. The opposite end of the shaft 65 has a sprocket 179 keyed thereon which drives a sprocket chain drive 180 to the upper of the lower pair 17 of rollers. The shaft 65 of the lower unit 11 has keyed on its end opposite that which carries gear 174, a gear 181. This gear 181 drives gear 182 which is carried on the adjacent end of shaft 61 of the lower belt unit 56 of upper cell-curing unit 10. Adjacent gear 182 the shaft 61 carries a sprocket which drives sprocket drive 183 to the lower roller of the upper pair 17. The opposite end of shaft 61 is provided with gear 184 keyed thereon which meshes with and drives a gear 185 keyed on the corresponding end of the shaft 65 of the upper belt unit 55. Adjacent gear 185 shaft 65 has a sprocket 186 keyed thereon which drives sprocket drive 187 for the upper roller of the upper pair 17. The shaft 61 through pinions 187a also drives a rearwardly extending shaft 188 which by means of pinions 189 drives a vertically disposed shaft 190. This shaft 190 is carried on the frame which supports the forming units 6 and 7 and is provided with vertically spaced pinions 191 which engage pinions carried on the ends of shafts 39 and 41 of the forming units 8 and 9. It will be noted that each shaft 41 is provided with a flexible joint 192 to permit the vertical movement of the frame 25 of each forming unit.

The gear box 171 also drives a forwardly extending shaft 193. This shaft 193 drives a gear box 194 which drives the shaft 100 of the adhesive-applying roller 99 through the medium of a sprocket and chain drive 195. Shaft 193 also drives a gear unit 196 which drives the shafts 105 of rollers 18 through the medium of two pairs of pinions 197 and 198 associated with these shafts and with a shaft 199 extending from the gear unit. One of the shafts 105 is extended and drives a chain drive 200 which is associated with sprockets 201 on the ends of the shafts 117 that carry the rollers 116 of the unit 13.

The gear box 196 also drives a forwardly extending shaft 202. This shaft through the medium of a pair of pinions 203 drives a pinion 204 carried by the lower shaft 131 of the rollers 19. The pinion 204 meshes with a pinion 205 of the shaft of the upper roller.

The drives for the pull through rollers 17, 18 and 19 are so designed that the speed of each successive set of rollers is slightly greater than the preceding set. This serves to keep the strip of material under tension during all of the various operations to prevent wrinkling or buckling thereof.

The shaft 126 of the trimmer unit 14 is driven by an independent electric motor 206. Similarly, the belt 151 which drives the flywheel 150 of the shear unit 15 is driven by an electric motor 208.

It will be apparent that with our method and apparatus, the strip of resin-impregnated fiber glass cloth will first have the longitudinally extending corrugations formed therein, will then be subjected to a curing operation which will cause the strip to retain its shape and then two of such strips will be brought together to form the laminated strip. This laminated strip will be secured together by a resin adhesive which will also be subjected to a curing operation. The edges of the laminated strip will be trimmed and the strip will be cut into sections of equal length. All of such operations will be performed progressively during the continuous movement of the strips. Furthermore, the strip will always be under tension which will prevent damage thereto.

Figure 22:
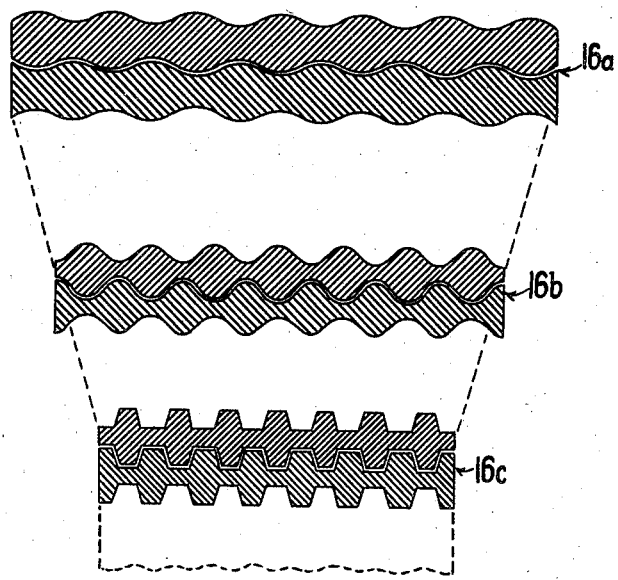
Figure 22 is a schematic view illustrating a different arrangement of forming rolls for forming the corrugations in the sheet material.

In Figure 22, we have illustrated diagrammatically how the forming rollers of the forming unit may be of different design in order to corrugate the material. In this case, successive pairs of rollers 16a, 16b and 16c will be provided, the rollers of each pair being complemental to each other. The cooperating grooves and ribs of these successive pairs of rollers gradually become more pronounced from one pair to the other. Thus, they will gradually form the corrugations in the strip of material and gradually narrow the strip as indicated.

Figure 23:
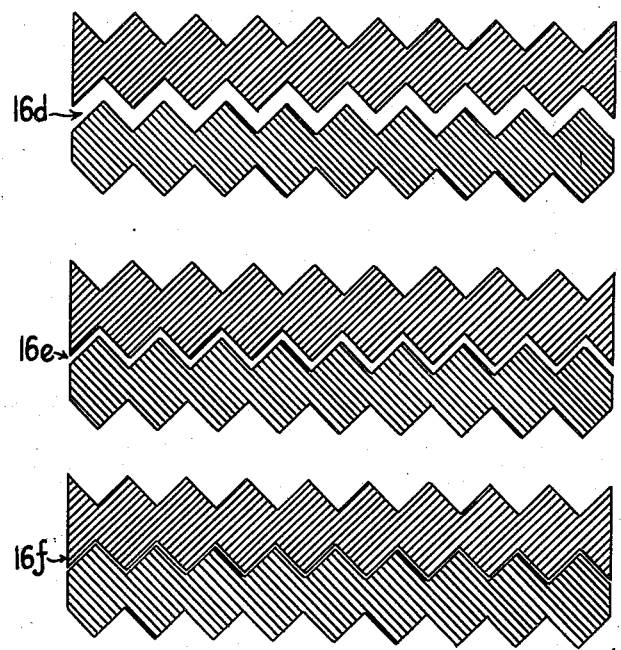
Figure 23 is a schematic view illustrating another arrangement for forming the corrugations in the sheet material.

In Figure 23, another arrangement of rollers is provided. In this instance, successive pairs 16d, 16e and 16f are provided. The interfitting rollers are provided with cooperating grooves and ribs which are shown of triangular form but which may be of any other desired form. The spacing between the two rollers of each successive pair gradually diminishes. Thus, the corrugations will be gradually formed in the strip.

Any other desired form of rollers may be provided to obtain any desired shape of cells.

It will be apparent that we have provided a method and apparatus having a number of important advantages. Some of these advantages have been discussed and others will be apparent from the description, the drawings, and the following claims.

Having thus described our invention, what we claim is:

1. The method of treating a strip of resin-impregnated material which comprises moving a strip of such material continuously, and continuously and progressively forming longitudinally extending corrugations in the strip and curing the strip to set the corrugations therein, all during the continuous movement of the strip, and maintaining the strip under tension during its continuous movement through the forming and curing operations to prevent buckling or wrinkling.

2. A method according to claim 1 wherein the corrugations are formed in the strip gradually from the center outwardly.

3. A method according to claim 2 wherein the strip is subjected to sufficient heat to cure or set the resin thereof.

4. A method according to claim 3 wherein the strip is formed between forming members having interfitting complemental ribs and grooves and is cured between platens having interfitting ribs and grooves that are complemental to the grooves and ribs produced in the strip by the forming members.

5. A method of forming a laminated cellular unit from strips of resin-impregnated material which comprises subjecting a plurality of simultaneously moving strips of such material continuously and progressively to a forming operation which forms longitudinally extending corrugations therein to a curing operation which sets the corrugations therein, and bringing the strips together during their continuous movement and causing them to adhere to each other and maintaining such strips under tension during their continuous movement through the forming and curing operations and while they are brought together to prevent buckling or wrinkling thereof.

6. A method according to claim 5 wherein the corrugations are formed in each strip gradually from the center outwardly.

7. A method according to claim 6 wherein each strip during the curing operation is subjected to sufficient heat to cure or set the resin thereof.

8. A method according to claim 7 wherein the strips are brought together and an adhesive is applied between the adjacent faces of the strips before they are brought together, such adhesive being in the form of a resin, and wherein the resulting laminated unit is subjected to heat and pressure to firmly bond the strips together.

9. A method according to claim 8 wherein the edges of the laminated strip are trimmed during the continuous movement thereof.

10. A method according to claim 9 wherein the trimmed laminated strip is sheared into sections during the continuous movement thereof.

11. Apparatus for forming longitudinally extending corrugations in sheets of resin-impregnated material which comprises a forming unit and a curing unit, said forming unit including rollers between which the sheet is passed and which are provided with interfitting ribs and grooves to form corrugations in the sheet, said curing unit comprising platens which are provided with interfitting ribs and grooves in alignment with the ribs and grooves of said rollers and, complemental to the grooves and ribs produced in the sheet material by the forming rollers, and means for heating such platens.

12. Apparatus according to claim 11 wherein the rollers are arranged in successive pairs, each roller having a forming section, the forming sections of succeeding pairs of rollers increasing in extent axially from the centers thereof.

13. Apparatus according to claim 12 wherein the platens of the curing unit are arranged in the form of two continuously moving belts between which the sheet is fed.

14. Apparatus according to claim 13 wherein each belt is composed of transversely extending platens hinged together at transversely extending hinged joints, the hinged joints of one belt being so arranged relative to the hinged joints of the other belt that when the platens of the adjacent flights of the belt meet, the hinged joints of one are offset relative to those of the other.

15. Apparatus for forming longitudinally extending corrugations in strips of resin-impregnated material during continuous movement of the strips which comprises a forming unit including a plurality of positively and continuously driven forming rollers between which the strip is passed, a curing unit for receiving the formed strip, said curing unit including positively and continuously driven continuous platen belts, between which the strip is passed, means for heating such belts, and means beyond the curing unit for pulling the strip continuously through the forming and curing units.

16. Apparatus according to claim 15 including a plurality of the forming and curing units disposed in superimposed relationship for operating on a plurality of strips simultaneously, means for bringing such strips into superimposed relationship, means for applying an adhesive to at least one of the adjacent faces of the strips before bringing them together, and means for pressing them together to form a laminated strip.

17. Apparatus according to claim 16 comprising a pressing and heating unit through which the superimposed strips are drawn to secure them together.

18. Apparatus according to claim 17 including means beyond the pressing and heating unit for pulling the laminated strip therethrough.

19. Apparatus according to claim 18 including a trimming unit beyond the heating and pressing unit for trimming the edges of the laminated strip.

20. Apparatus according to claim 19 including means beyond the trimming unit for pulling the strip therethrough.

21. Apparatus according to claim 20 including means beyond the pulling unit for shearing the laminated strip during its continuous movement into sections of equal length.

22. Apparatus according to claim 21 including means for varying the length of the sections sheared from the strip.

23. Apparatus for forming longitudinally extending corrugations in strips of resin-impregnated material during continuous movement of the strips which comprises a forming unit including a plurality of pairs of positively and continuously driven forming rollers between which a strip is passed, a curing unit for receiving the formed strip, said curing unit including a pair of positively and continuously driven continuous platen belts between which the strip is passed, means for heating such belts, and a pair of rollers beyond the curing unit which are positively and continuously driven, the pairs of successive rollers being driven at gradually increasing speeds for pulling the strip continuously through the forming and curing units.

24. Apparatus according to claim 23 wherein the forming unit includes successive pairs of upper and lower complemental forming rollers, the lower rollers being carried by a fixed frame and the upper rollers being carried by a frame movably mounted on the lower frame, and means for yieldingly forcing the upper frame downwardly to cause the upper rollers to yieldingly press the strip against the lower rollers.

LEONARD S. MEYER.
ERIC K. RITTERHOFF.

REFERENCES CITED

The following references are of record in the file of this patent:

UNITED STATES PATENTS

| Number | Name | Date |
| --- | --- | --- |
| 775,495 | McConnell | Nov. 22, 1904 |
| 793,316 | McMillin | June 27, 1905 |
| 1,457,664 | Ford | June 5, 1923 |
| 1,906,342 | Smith | May 2, 1933 |
| 2,163,063 | Romanoff | June 20, 1939 |
| 2,494,642 | Case et al. | Jan. 17, 1950 |

OTHER REFERENCES

"Production of Honeycomb Cores," by J. D. Lincoln, Modern Plastics, vol. 23, No. 9, pages 127-129, May 1946.